Figure 1:
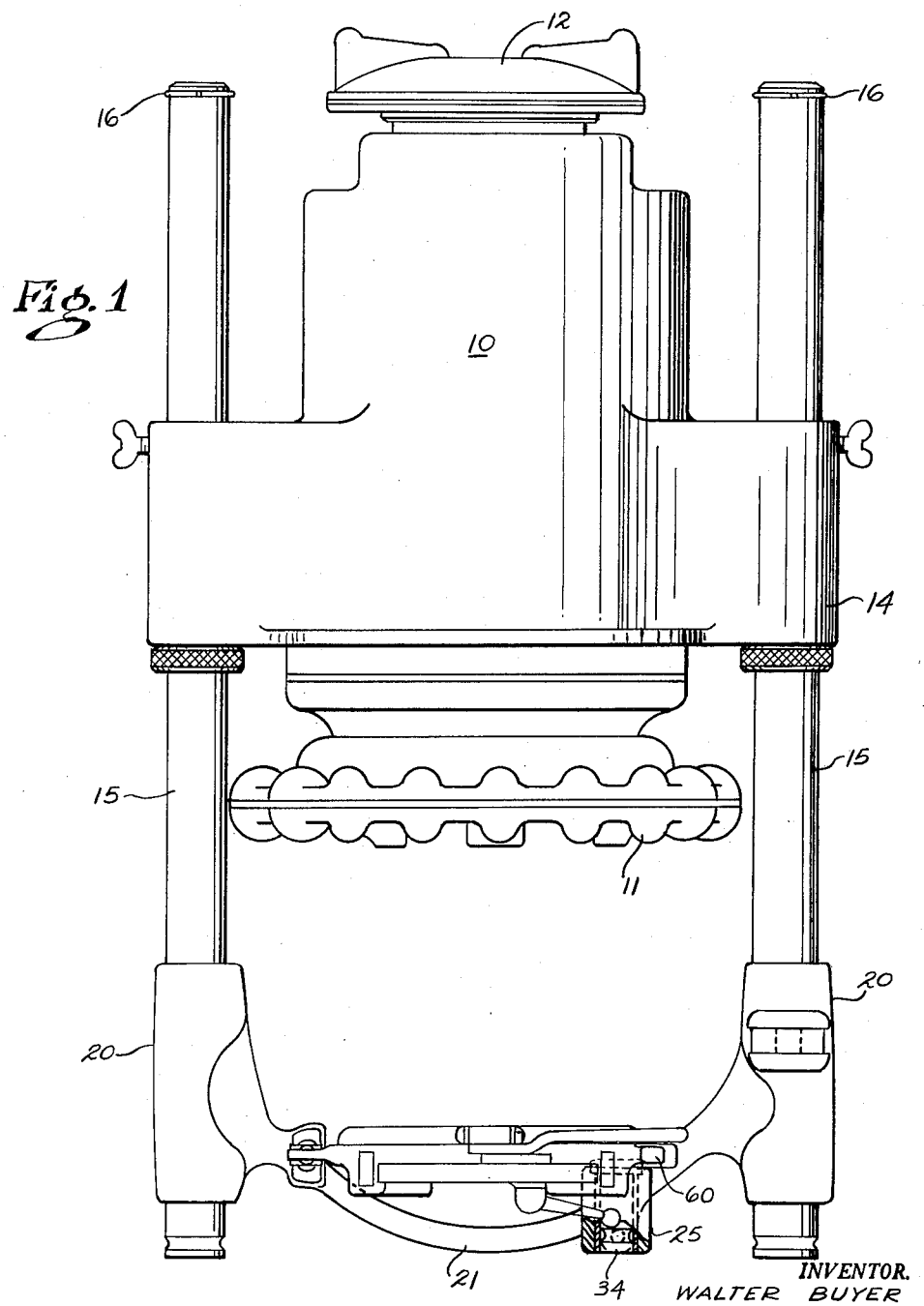

INVENTOR.
WALTER BUYER

INVENTOR.
WALTER BUYER

United States Patent Office 3,009,178
Patented Nov. 21, 1961

3,009,178
CARRIAGE FOR THREADING DIE HAVING ADJUSTABLE POSITIONING MEANS FOR SUPPORTING THE DIE
Walter Buyer, North Olmsted, Ohio, assignor to The Ridge Tool Company, Elyria, Ohio, a corporation of Ohio
Filed June 22, 1959, Ser. No. 821,854
4 Claims. (Cl. 10—89)

This invention relates to apparatus for the threading and cutting of pipe and more particularly to a machine which is portable and which may be readily disassembled for carrying it from place to place.

Heretofore it has been proposed to provide a portable power drive which is comprised of a motor driven spindle having a chuck on one end and a pipe centering device on the other end. The spindle is rotatably supported in a housing which may be mounted on a bench or suitable legs. This device is used for supporting and rotating a pipe and the workman then engages the pipe with a thread cutting die, a pipe cutter or a reamer to perform the operations of cutting, threading and/or reaming pipe.

Some of the problems encountered with the above devices included the fact that the thread cutting tool might not be properly aligned with the pipe. Therefore the threads were cut eccentric or out of axis with the pipe. In addition, the worker must hold the die during the cutting operation, which is laborious. In some instances the tool was wrenched from his hands and turned with the pipe, resulting in injuries to the workman.

In order to avoid the need for holding the thread cutting tool, power drives have been provided with pairs of bars or tubes that extended forwardly of the pipe chuck and parallel to the axis thereof. In this instance the thread cutting die was provided with long handles which could be rested against the bars and which prevented turning of the die relative to the pipe. There still remained the problem, however, of properly aligning the die with the pipe so that the thread would be in the proper position thereon.

By the present invention there has been provided a carriage which may be readily slipped onto the support bars of a power drive and which after installation may be moved forward and backward by hand toward the rotating pipe. The carriage is arranged to support a thread cutting die and a pipe cutter if desired.

Although these functions have been provided in pipe threading machines, such as shown in Patent No. 2,768,550 of C. H. Ingwer et al., of October 30, 1956, it will be appreciated that machines of the patent are not classed as portable and are used as more or less permanent installations such as in machine shops.

By the present invention a very light-weight machine may be provided which may be quickly and easily disassembled and carried into the field.

Furthermore there has been provided an improved centering means which can be adjusted so that the die is properly centered relative to the pipe, and which is also so arranged that should the pipe be slightly bent, so that it wobbles during the start of the cutting operation, the die may adjust itself automatically to properly engage the pipe.

Still other objects of the invention and the invention itself will become more apparent from the following description of an embodiment thereof, which is illustrated by the accompanying drawings, and forms a part of the specification.

Figure 2:
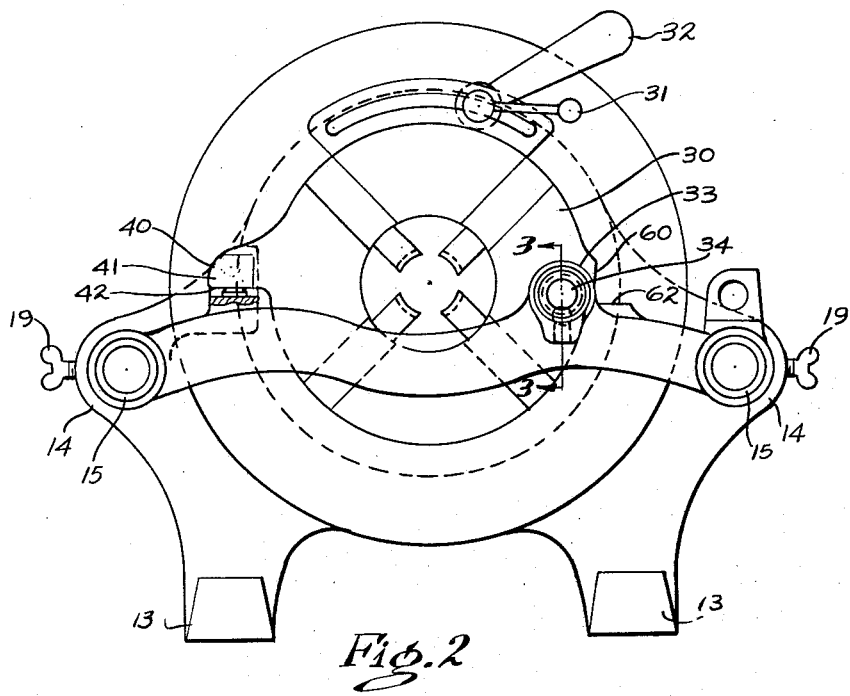
Figure 3:
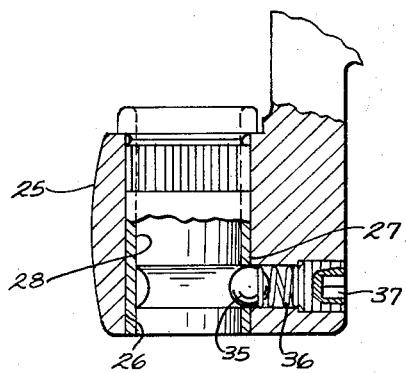
Figure 4:
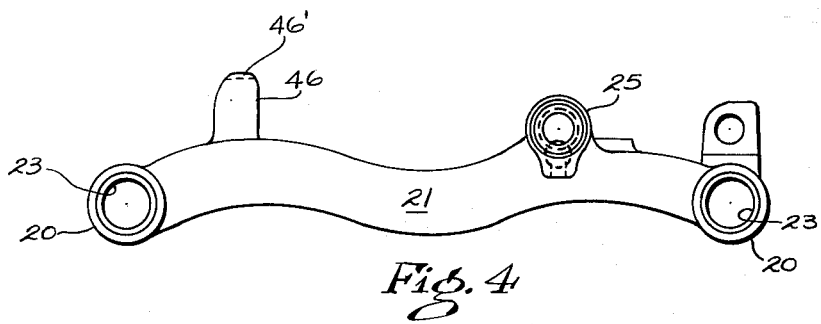
Figure 5:
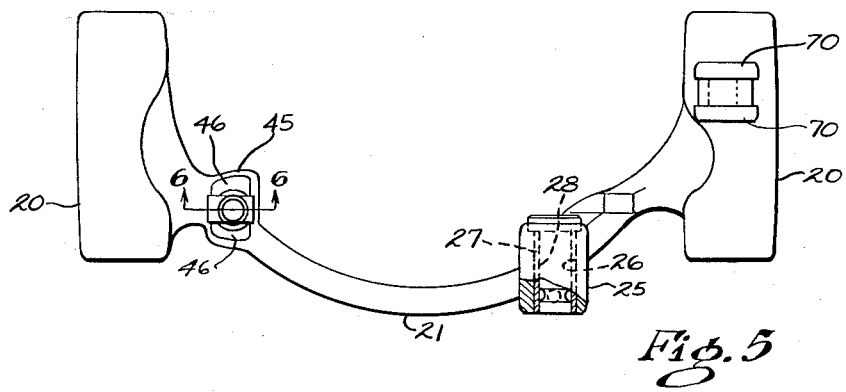
Figure 6:
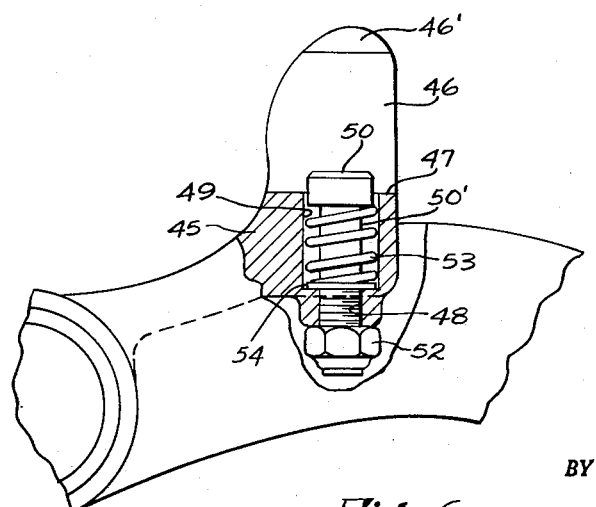

In the drawings:
FIG. 1 is a top plan view of a power drive showing the carriage of the invention and a thread cutting die thereon;
FIG. 2 is a front elevational view thereof;
FIG. 3 is a section taken on the line 3—3 of FIG. 2;
FIG. 4 is an elevational view of the carriage removed from the machine and with the die removed;
FIG. 5 is a plan view thereof; and
FIG. 6 is an enlarged fragmentary section taken from the line 6—6 of FIG. 5.

Referring now to the drawings, throughout which like parts are designated by like reference characters and particularly to FIG. 1, the power drive includes a housing 10 which rotatably supports a spindle therein having a chuck 11 on one end and a work centering device 12 on the other end. As best shown in FIG. 2, the housing is provided with feet 13 which enables it to be secured on a suitable stand having legs or set upon a table or bench. On opposite sides of the housing there are provided laterally extending ears 14 provided with bores which extend parallel to the axis of the chuck, spindle and work centering device. Each of the ears has slidably journalled therein a tube 15 the rear ends of which may be provided with C rings 16 to prevent the tubes from being moved out of the ears when moved in a forward direction.

The tubes are of sufficient length so that they project well beyond the front of the power drive on each side of the chuck. The distance they extend beyond the front of the chuck is determined by the length of the tubes and their position in the ears.

The tubes are adapted to be inserted into the ears from the rear of the power drive. Preferably the forward end of the tubes is without obstruction. Suitable rings are provided on the tube which may be slid back to the motor housing and serves as an abutment for the slide carriage, later described, to prevent it from hitting the chuck. These rings are prevented from sliding off the ends of the tube by notches in the ends of the tubes and springs inside of the rings. The carriage may be quickly installed and easily removed from the tubes.

As best shown in FIGS. 3 to 6 inclusive, the carriage comprises a pair of tubular members 20 which are connected together by a bridge portion 21. The tubular members are parallel to each other and properly spaced apart so that they may be slid onto the tubes 15 of the power drive. Suitable bearing sleeves 23 are provided in each of the members 20 to provide a smooth sliding engagement with the support tubes.

As best shown in FIG. 5, the bridge 21 curves outwardly from the supports to provide ample clearance space when the carriage is advanced toward the chuck and to also enable it to be gripped in the center portion by the hand when desired.

On the right side of the bridge there is provided an upwardly extending boss 25 which is provided with a bore 26 in which a bearing element or bushing 27 is disposed. The bearing element, as shown in FIG. 3, has a bore 28 for rceiving a support pin 34 on a threading die and a head, for engagement with the die to provide proper positioning of the die in the carriage.

On the opposite side of the bridge there is provided an adjustable seat for a support arm carried on the threading die.

The threading die is similar to that shown in the above-mentioned patent and mechanically is the same as that shown in Patent 2,680,256 of June 8, 1952, to C. H. Ingwer et al. and therefore will not be described in detail. It includes a chaser holding body 30, a size adjusting lever 31 and a chaser opening and closing handle 32.

At one side of the die, mounted in a boss 33 is a forwardly extending support pin 34. This pin is adapted to be disposed in the bore 28 of the bearing element whereby the die may be pivotally supported from the carriage. The die is held against accidental removal by a spring pressed ball 35 which protrudes through an opening in the bearing element 27. The ball 35 is disposed in a bore in the boss 25 and pressed by a spring 36 which is held by a screw 37.

The other side of the die is provided with an outwardly extending foot 40 having a pair of flat sides 41 and a seat engaging portion 42 on its underside.

As previously stated, the left side of the carriage is provided with a seat, for engagement with the foot 40 of the die, and with the seat engaging part 42. As best shown in FIGS. 5 and 6, the carriage is provided with a boss 45 which has a pair of spaced parallel upstanding arms 46. The upper ends of the arms are chamfered at 46' to provide an inwardly and downwardly slanting surface for guiding engagement with the die foot 41. The inner faces of the arms are machined smooth and spaced apart a distance to receive snugly the foot which also has machined sides. At the lower ends of the arms 46 is a seat or floor 47. Opening into the seat is a bore 49 which also opens through the bottom of the boss 45.

A shock and position pin for the die foot is provided in the bore 48—49 and includes a head 50 which projects above the top of the bore 48 and the floor 47. A stem 50' is integral with the head and extends through the bore 48—49, the end projecting beyond the bottom of the boss 45 and having an adjusting and holding nut 52 threaded thereon. Between the head 50 and the bottom of the bore 48 is a helical spring 53. One end of the spring bears against the underside of the head 50 and the other end against a washer 54 in the bottom of the bore and holds the shock pin resiliently in an upward position determined by the position of the adjusting nut 52.

When the die is swung over to operating position, the foot 41 slides down between the arm 40 and hits the head 50 of the stop pin. Thus the shock is absorbed since the weight of lowering the foot on the pin can compress the spring 53. It should be pointed out, however, that the spring 53 is sufficiently stiff that with the die in place, the pin eventually comes to rest in the upward position. Thus the centering of the die relative to the work can be effected by adjusting the nut 52.

The die may be readily swung upward and outward upon the pivot pin 34 and when in its most outer position an abutment 60 on the die engages with a seat 62 rearwardly and outwardly of the pivot pin boss 25 on the carriage; this being a place where the center of gravity of the die is outwardly of its pivot pin, it readily stays in this position without falling back to the operative position.

Provision is also made for mounting a pipe cutter should it be desired. A pair of spaced ears 70 are provided on the right hand support 20 of the carriage and the pipe cutter, not shown, may be mounted on a pivot pin between the ears. Obviously a single such lug could be used, and the cutter provided with a fork or yoke for engagement therewith.

In operation, the power drive unit may be transported to the place where the device is to be used with or without the tubular ways in position. If the ways are in place, they make a convenient means for engagement by the workman for transportation. When the machine is set up, if the tubular ways are not already in place, they are inserted in the ears 14 with the ends projecting well ahead of the chuck 11. They may be locked in position by set screws 19 which extend through the ears on the housing and engage the ways. Collars on the ways could also be used to lock the same in position. Actually it has been found that both the collars and screws may be omitted.

The carriage is then slid onto the ways and the threading die placed in position. The pipe to be threaded is inserted through the power drive projecting beyond the chuck a suitable distance. The die is then swung down into position. The carriage is then slid back with its die, toward the pipe. Ordinarily the die is centered relative to the pipe by adjusting the shock pin nut. Once adjusted it should normally need no further adjustment for some time. Should the pipe be slightly off center, as it occasionally is, the resilient support for the foot allows the die to automatically adjust itself to the proper position for the threading operation. On larger pipe the torque will cause the spring to compress and the foot of the die will seat on the seat 47.

The action of the spring support for the die provides better thread cutting because the die is capable of a certain amount of floating action which causes the chaser to cut evenly and equally.

It will be apparent that the die may be swung over and dropped into position without damage thereto due to the shock absorbing characteristics of the support. When the threading operation is completed, the die is opened with the handle 32 and the carriage slid forward away from the pipe, after which the pipe may be removed.

Because the device is so easily assembled and disassembled, the separate components may be carried to and from the place where they are used by one workman.

Having thus described the invention in an embodiment thereof, it will be appreciated that numerous and extensive departures may be made therefrom without departing from the spirit of the invention as defined in the appended claims.

I claim:

1. In combination with a power drive including a power drive chuck for supporting and rotating a work piece, a pair of tubular guide members extending parallel to the axis of the chuck, a carriage for mounting on said guides comprising a pair of sleeve members for slidable engagement with the guide members, a bridge portion extending between and connecting the sleeve members, a threading die for mounting on said carriage, means to pivotally mount said die on one side of the carriage, and positioning means for said die disposed on the other side of the carriage and said die having means for engagement therewith, said positioning means comprising a boss having a bore extending therethrough, a vertical pin extending through said bore having a head on its upper end and an adjustable nut on its lower end, a helical spring mounted on said pin below said head, a washer mounted on said pin below said spring, a shoulder formed in said bore, said washer being seated on said shoulder whereby said pin may be adjustable upwardly or downwardly by said nut to center the die with respect to the work piece.

2. In combination with a power drive including a power drive chuck for supporting and rotating a work piece, a pair of tubular guide members extending parallel to the axis of the chuck, a carriage for mounting on said guides comprising a pair of sleeve members for slidable engagement with the guide members, a bridge portion extending between and connecting the sleeve members, a threading die for mounting on said carriage, means to pivotally mount said die on one side of the carriage, and positioning means for said die disposed on the other side of the carriage and said die having means for engagement therewith, said positioning means comprising a boss having a bore extending therethrough, a vertical pin extending through said bore having a head on its upper end and a threaded lower end, a nut threaded on said lower end, said head projecting above said bore, said nut being located below said bore, a helical spring mounted on said pin bearing against said head, abutting means in the lower end of said bore with said spring being supported thereon, whereby said pin can be moved upwardly or downwardly by rotating said nut to center said die with respect to said work piece.

3. A tool supporting carriage for cooperation with a power drive having an article holding chuck and a pair of parallel guide bars extending parallel to the axis of the chuck on opposite sides thereof comprising a pair of bar engaging members, a bridge portion connecting the bar engaging members and means for pivotally supporting a threading die on said carriage adjacent one of said engaging members, said means comprising a boss having a bore extending therethrough adjacent the other of said engaging members, a vertical pin extending through said bore having a head on its upper end and an adjustable nut on its lower end, a helical spring mounted on said pin below said head, abutting means in said bore, said spring being seated on said abutting means whereby said pin may be adjusted upwardly or downwardly by said nut to center the die with respect to the work piece.

4. In combination with a power drive including a power drive chuck for supporting and rotating a work piece, a pair of tubular guide members extending parallel to the axis of the chuck, a carriage for mounting on said guides comprising a pair of sleeve members for slidable engagement with the guide members, a bridge portion extending between and connecting the sleeve members, a threading die for mounting on said carriage, means to pivotally mount said die on one side of the carriage, and positioning means for said die disposed on the other side of the carriage and said die having means for engagement therewith, said positioning means comprising a boss having a bore extending therethrough, a vertical pin extending through said bore having a head on its upper end and an adjustable nut on its lower end, a helical spring mounted on said pin below said head, abutting means in said bore, said spring bearing against said abutting means whereby said pin may be adjustable upwardly or downwardly by said nut to center the die with respect to the work piece.

References Cited in the file of this patent

UNITED STATES PATENTS

| | | |
|---|---|---|
| 2,601,716 | Laningham | July 1, 1952 |
| 2,768,550 | Ingwer | Oct. 30, 1956 |